United States Patent [19]
Blackburn

[11] Patent Number: 5,399,123
[45] Date of Patent: Mar. 21, 1995

[54] VARIABLE SPEED TRANSMISSION

[76] Inventor: Claude Blackburn, 4910 Portage Lapointe, St-Ambroise, Québec, Canada, G0V 1R0

[21] Appl. No.: 145,198
[22] Filed: Nov. 3, 1993
[51] Int. Cl.6 ............................................. F16H 61/00
[52] U.S. Cl. ....................... 474/16; 474/18; 474/28
[58] Field of Search .................. 474/8, 16, 18, 28

[56] References Cited

U.S. PATENT DOCUMENTS

| 3,782,213 | 1/1974 | Rattunde | 74/230 |
| 3,894,440 | 7/1975 | Marceau | 474/28 X |
| 4,023,425 | 5/1977 | Parker | 474/16 |
| 4,143,558 | 3/1979 | van Deursen et al. | 474/28 |
| 4,350,491 | 9/1982 | Steuer | 474/28 X |
| 5,052,981 | 10/1991 | Robert | 474/14 |
| 5,108,347 | 4/1992 | Gourdon | 474/13 |
| 5,145,464 | 9/1992 | Mori | 474/16 |

FOREIGN PATENT DOCUMENTS 1487241 9/1977 United Kingdom .

Primary Examiner—Roger J. Schoeppel
Attorney, Agent, or Firm—Michael D. Bednarek, Marks & Murase

[57] ABSTRACT

The variable speed transmission is for transmitting a torque produced by an engine to a belt. The transmission comprises a shaft connected to the engine, a fixed flange and a movable flange slidably connected to the shaft and substantially rotatable thereon. The flanges define therebetween a groove for receiving the belt. A pressure device is rigidly connected to the movable flange. The pressure device has a pair of pressure units diametrically opposed for pressurizing fluids. Each pressure unit comprises a first fluid chamber, a second fluid chamber, a radially movable partition separating the first fluid chamber from the second fluid chamber, resilient means for applying a return force toward the shaft counterbalancing the centrifugal force, and a fixed partition rigidly connected to the shaft. The fixed partition also separates the first fluid chamber from the second fluid chamber. As the centrifugal force urges the movable partitions away from the shaft, the fluids in the first fluid chambers are urged to circulate away from the shaft, and the fluids in the second fluid chambers are urged to circulate, generating a sliding movement of the pressure device and of the movable flange toward the fixed flange. This sliding movement causes a variable transmission of torque from said engine to the belt.

8 Claims, 2 Drawing Sheets

VARIABLE SPEED TRANSMISSION

FIELD OF THE INVENTION

The present invention relates to variable speed transmissions for small vehicles, and more particularly to a variable speed transmission for transmitting a torque produced by an engine to a belt.

BACKGROUND OF THE INVENTION

Known in the art is British Patent No. 1,487,241 (Parker) filed on Feb. 6, 1974, which describes improvements relating to a transmission element. The transmission element consists of a pulley having a pair of plates mounted in opposed dispositions upon a shaft and rotatable by a belt in between to rotate the shaft. A liquid-tight cylinder secured to the second plate contains a piston fixed relative to the first plate and divides the cylinder in two chambers. A liquid in one chamber responds to centrifugal force resulting from the pulley rotation to move the second plate from the first to reduce the pulley diameter. A return spring in the other chamber returns the second plate as the centrifugal force is reduced and increases the diameter.

In U.S. Pat. No. 3,782,213 (Rattunde) issued on Jan. 1st, 1974, there is described an infinitely variable cone pulley transmission supplied with a pressure fluid entering through a passage in the transmission and that escapes therefrom through a narrow annular slot close to the shaft axis.

In U.S. Pat. No. 5,052,981 (Robert) issued on Oct. 1st, 1991, there is described a variable diameter pulley with centrifugal weights. This pulley has a movable cheek and a stationary cheek, where the movable cheek is forced toward the stationary cheek upon application of a centrifugal force. The centrifugal force acts on the weights that push the movable cheek.

In U.S. Pat. No. 5,108,347 (Gourdon) issued on Apr. 28, 1992, there is described a speed variator pulley provided with a transmission membrane. This pulley has a fixed cheek and a movable cheek, where as a shaft rotates, inertia blocks located in a reaction cup behind the movable cheek are subject to centrifugal forces which cause the movable cheek to move toward the fixed cheek.

In U.S. Pat. No. 5,145,464 (Mori) issued on Sep. 8, 1992, there is described a centrifugal oil pressure control device having a movable sheave and a fixed sheave, where the movable sheave is pushed away from the fixed sheave on application of a centrifugal force.

SUMMARY OF THE INVENTION

It is therefore an object of the present invention to provide a very simple and reliable variable speed transmission that transmits a torque produced by an engine to a belt.

According to the present invention, there is provided a variable speed transmission for transmitting a torque produced by an engine to a belt, said transmission comprising:

a shaft having a first end for connection to said engine, and a second end;

a pulley having a fixed flange fixedly connected to said second end of said shaft, and a movable flange slidably connected to said shaft and substantially rotatable therewith, said flanges having respectively coaxial side cheeks mounted in opposition and defining therebetween a groove for receiving said belt;

a pressure device rigidly connected to said movable flange, slidably connected to said shaft and substantially rotatable thereon, said pressure device having a pair of pressure units diametrically opposed for pressurizing fluids, each pressure unit comprising:

a first fluid chamber divided in a first and a second variable compartment, said first and second compartments being connected by a first channel;

a second fluid chamber divided in a third and a fourth variable compartment, said third and fourth compartments being connected by a second channel;

a radially movable partition, having a specific weight, for separating said second compartment from said third compartment, said second compartment being closer to said shaft than said third compartment, said movable partition being movable away from said shaft upon subjection of an increasing centrifugal force on the specific weight thereof;

resilient means for applying a return force toward said shaft for counterbalancing said centrifugal force;

a fixed partition rigidly connected to said shaft, said fixed partition separating said first compartment from said fourth compartment;

whereby, in operation, when said shaft rotates, said centrifugal force urges the movable partitions away from said shaft, the fluids in said first fluid chambers are urged to circulate from their first compartment into their corresponding second compartment and said fluids in said second fluid chambers are urged to circulate from their third compartment into their corresponding fourth compartment, so that a volume expansion of said fourth compartments and a volume reduction of said first compartments produce a sliding movement of the pressure device and of the movable flange toward the fixed flange, causing a variable transmission of torque from said engine to said belt.

BRIEF DESCRIPTION OF THE DRAWINGS

In order to impart full understanding of the manner in which these and other objectives are attained in accordance with the present invention, preferred embodiments thereof are described hereinafter with reference to the accompanying drawings wherein.

DESCRIPTION OF PREFERRED EMBODIMENTS

Figure 1:
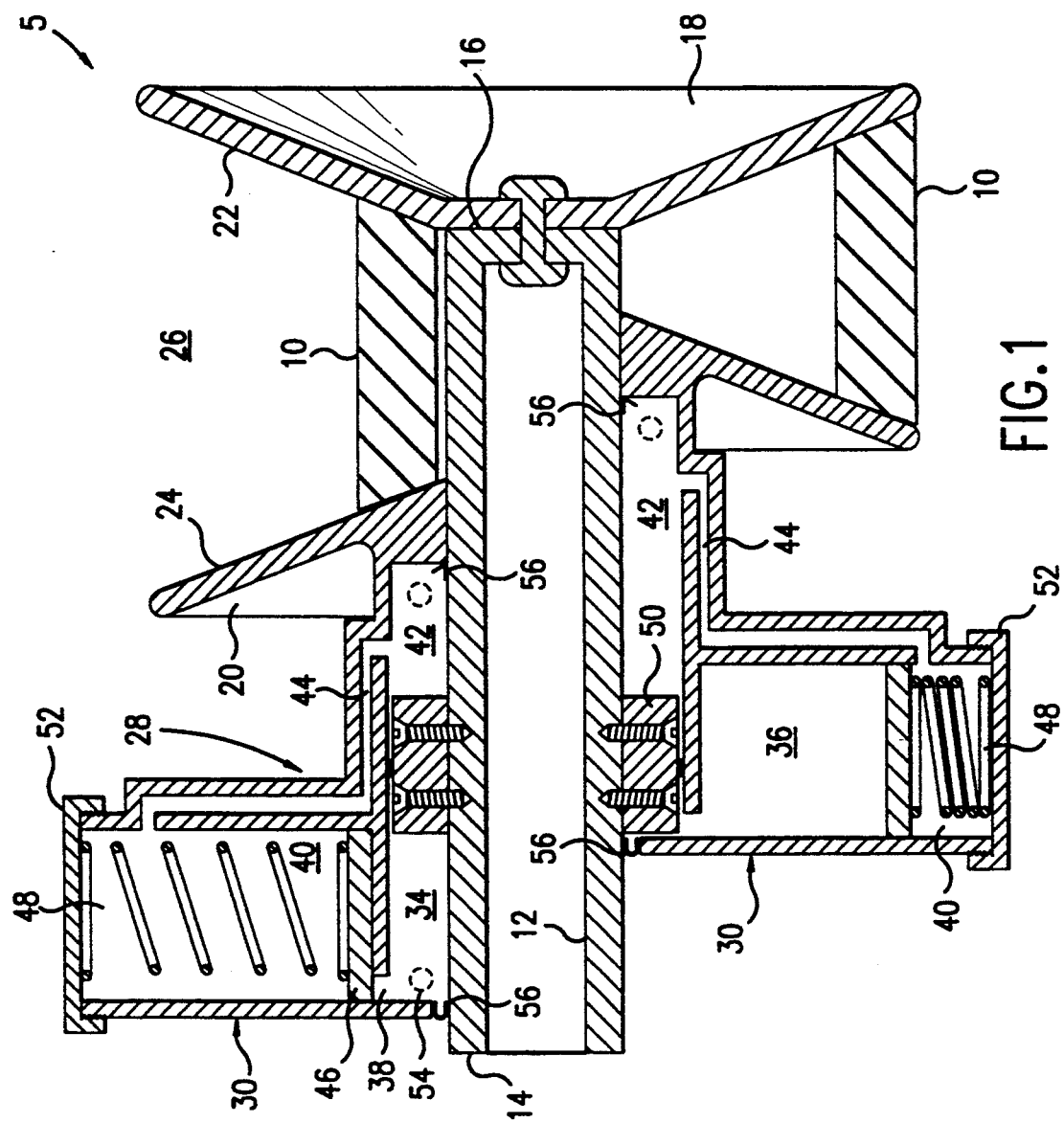
FIG. 1 is a cross-sectional side elevation view of the variable speed transmission represented at low speed in the upper portion and represented at high speed in the lower portion.

Referring to FIG. 1, there is shown a variable speed transmission 5 according to the present invention, for transmitting a torque produced by an engine (not shown) to a trapezoidal belt 10.

The variable speed transmission 5 comprises a shaft 12 having a first end 14 for connection to said engine, and a second end 16. There is provided a fixed flange 18 fixedly connected to said second end 16, and a movable flange 20 slidably connected to said shaft 12 and substantially rotatable thereon. The flanges 18 and 20 have respectively coaxial side cheeks 22 and 24 mounted in opposition and defining therebetween a groove 26 for receiving said belt 10.

The variable speed transmission 5 also comprises a pressure device 28 rigidly connected to said movable flange 20, slidably connected to said shaft 12 and substantially rotatable thereon. The pressure device 28 has a pair of pressure units 30 diametrically opposed for pressurizing fluids. The transmission may also have a plurality of pairs of pressure units 30 equally disposed around said shaft 12.

Each pressure unit 30 comprises a first fluid chamber divided in a first and a second variable compartment 34 and 36 connected by a first channel 38, and a second fluid chamber divided in a third and a fourth variable compartment 40 and 42 connected by a second channel 44.

The fluids in the first and second fluid chambers are oil based liquids.

Each pressure unit 30 also comprises a radially movable partition 46, having a specific weight. The movable partition 46 separates said second compartment 36 from said third compartment 40, where said second compartment 36 is closer to said shaft 12 than said third compartment 40. The movable partition 46 is moved away from said shaft 12 upon subjection of an increasing centrifugal force on the specific weight thereof, which is when the rotation speed of the pulley increases. Of course, the movable partition 46 is also moved toward the shaft 12 when the centrifugal force decreases.

Each pressure unit 30 also comprises resilient means for applying a return force toward said shaft 12 for counterbalancing said centrifugal force. The resilient means comprise a helicoidal spring 48 provided in each third compartment 40. Each of said third compartments 40 has a screwing cap 52 facing the corresponding movable partition 46. The caps 52 are particularly useful for adding said fluids in said third and fourth compartments 40 and 42 and for accessing those compartments. Each spring 48 has a first end resting on the corresponding cap 52 and a second end resting on its corresponding movable partition 46. A fixed partition 50 is rigidly connected to said shaft 12 for separating said first compartment 34 from said fourth compartment 42.

Each of said first compartments 34 has an aperture 54 filled up by a screw (not shown). The aperture 54 is provided for adding said fluids in said first and second compartments 34 and 36.

The pressure device 28 is hermetically sealed against said shaft 12 by C-shaped seals 56 retaining said fluids into said pressure device 28.

Figure 2:
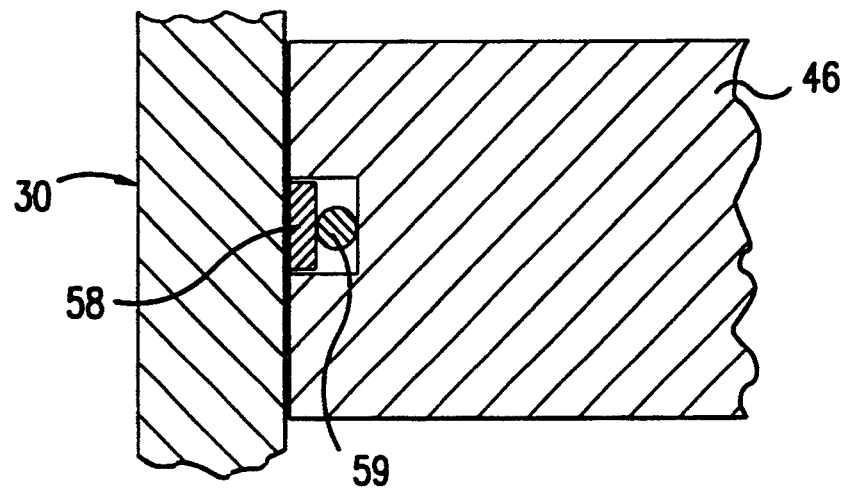
FIG. 2 is an enlarged cross-sectional view showing the details of the first sealing means.

The transmission further comprises first sealing means for hermetically sealing each of said second compartments 36 from their corresponding third compartment 40. As shown in FIG. 2, the first sealing means comprise a polymer extrusion 58 in contact with each of said movable partitions 46, said polymer extrusion 58 being pushed by an O-ring 59 placed between said polymer extrusion and the corresponding movable partition 46.

Figure 3:
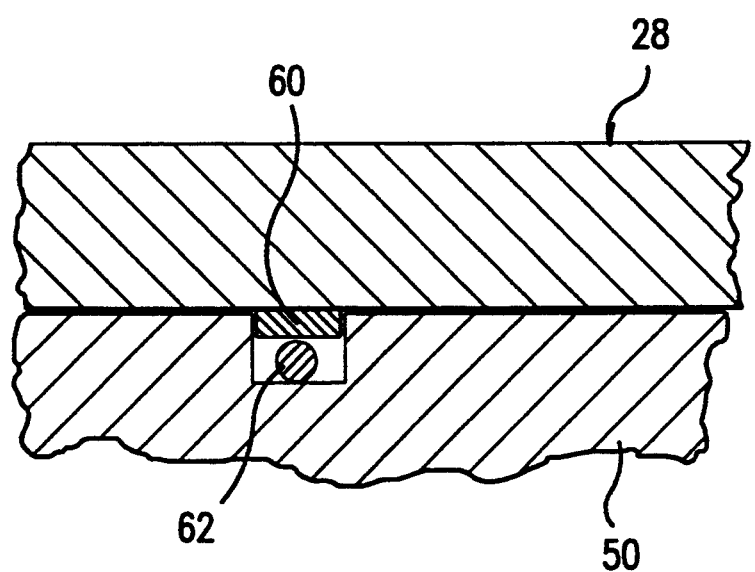
FIG. 3 is an enlarged cross-sectional view showing the details of the second sealing means.

The transmission also comprises second sealing means for hermetically sealing each of said first compartments 34 from their corresponding fourth compartment 42. As shown in FIG. 3, the second sealing means comprise a polymer extrusion 60 in contact with said pressure device 28, said polymer extrusion 60 being pushed by an O-ring 62 placed between said polymer extrusion 60 and said fixed partition 50.

In operation, when said shaft 12 rotates, said centrifugal force urges the movable partitions 46 away from said shaft 12. The fluids in said first fluid chambers are urged to circulate from their first compartment 34 into their corresponding second compartment 36. The fluids in said second fluid chambers are urged to circulate from their third compartment 40 into their corresponding fourth compartment 42. A volume expansion of said fourth compartments 42 and a volume reduction of said first compartments 34 produce a sliding movement of the pressure device 28 and of the movable flange 20 toward the fixed flange 18. This sliding movement causes a variable transmission of torque from said engine to said belt.

Although the present invention has been explained hereinabove by way of preferred embodiments thereof, it should be pointed out that any modifications to these preferred embodiments, within the scope of the appended claims, are not deemed to change or alter the nature and scope of the present invention.

I claim:

1. A variable speed transmission for transmitting a torque produced by an engine to a belt, said transmission comprising:

a shaft having a first end for connection to said engine, and a second end;

a pulley having a fixed flange fixedly connected to said second end of said shaft, and a movable flange slidably connected to said shaft and substantially rotatable therewith, said movable flange and said fixed flange having respectively coaxial side cheeks mounted in opposition and defining therebetween a groove for receiving said belt;

a pressure device rigidly connected to said movable flange, slidably connected to said shaft and substantially rotatable thereon, said pressure device having a pair of pressure units diametrically opposed for pressurizing fluids, each pressure unit comprising:

a first fluid chamber divided in a first and a second variable compartment, said first and second compartments being connected by a first channel;

a second fluid chamber divided in a third and a fourth variable compartment, said third and fourth compartments being connected by a second channel;

a radially movable partition, having a specific weight, for separating said second compartment from said third compartment, said second compartment being closer to said shaft than said third compartment, said movable partition being movable away from said shaft upon subjection of an increasing centrifugal force on the specific weight thereof;

resilient means for applying a return force toward said shaft for counterbalancing said centrifugal force;

a fixed partition rigidly connected to said shaft, said fixed partition separating said first compartment from said fourth compartment;

whereby, in operation, when said shaft rotates, said centrifugal force urges the movable partition away from said shaft, the fluid in said first fluid chamber is urged to circulate from their first compartment into their corresponding second compartment and said fluids in said second fluid chambers are urged to circulate from their third compartment into their corresponding fourth compartment, so that a volume expansion of said fourth compartment and a volume reduction of said first compartment produce a sliding movement of the pressure device and of the movable flange toward the fixed flange, causing a variable transmission of torque from said engine to said belt.

2. A transmission according to claim 1, wherein a plurality of pairs of pressure units are equally disposed around said shaft.

3. A transmission according to claim 2, wherein:
each of said third compartments has a screwing cap, facing the corresponding movable partition, for adding said fluids in said third and fourth compartments; and
each of said first compartments has an aperture, filled up by a screw, for adding said fluids in said first and second compartments.

4. A transmission according to claim 3, wherein said resilient means comprise a helicoidal spring provided in each third compartment, each spring having a first end resting on a corresponding cap and a second end resting on the corresponding movable partition.

5. A transmission according to claim 3, wherein said pressure device is hermetically sealed against said shaft by C-shaped seals retaining said fluids into said pressure device.

6. A transmission according to claim 3, further comprising first sealing means for hermetically sealing each of said second compartments from their corresponding third compartment, said first sealing means comprising a polymer extrusion circumferentially provided around each of said movable partitions, said polymer extrusion being pushed by an O-ring placed between said polymer extrusion and the corresponding movable partition.

7. A transmission according to claim 3, further comprising second sealing means for hermetically sealing each of said first compartments from their corresponding fourth compartment, said second sealing means comprising a polymer extrusion in contact with said pressure device, said polymer extrusion being pushed by an O-ring placed between said polymer extrusion and said fixed partition.

8. A transmission according to claim 1, wherein said fluids are oil based liquids.

* * * * *